(12) United States Patent
Bödicker et al.

(10) Patent No.: US 7,098,929 B2
(45) Date of Patent: Aug. 29, 2006

(54) DISPLAY SYSTEM AND METHOD FOR THE DISPLAY OF IMAGES

(75) Inventors: Anke Bödicker, Bremen (DE); Dietmar Dechow, Bremen (DE)

(73) Assignee: Mevis Breastcare GmbH & Co. KG, Bremen (DE)

( * ) Notice: Subject to any disclaimer, the term of this patent is extended or adjusted under 35 U.S.C. 154(b) by 344 days.

(21) Appl. No.: 10/247,758

(22) Filed: Sep. 19, 2002

(65) Prior Publication Data

US 2003/0071829 A1    Apr. 17, 2003

(30) Foreign Application Priority Data

Oct. 9, 2001    (DE) ................. 101 49 634

(51) Int. Cl.
G09G 5/00 (2006.01)
G06F 3/00 (2006.01)
G06F 17/00 (2006.01)

(52) U.S. Cl. ............... 345/619; 345/661; 715/700; 715/764

(58) Field of Classification Search ........ 345/619, 345/620, 621, 628–630, 661, 700, 723, 763–765, 345/781, 783, 788, 798, 802, 156, 835, 854
See application file for complete search history.

(56) References Cited

U.S. PATENT DOCUMENTS

| | | | |
|---|---|---|---|
| 5,988,851 A * | 11/1999 | Gent | 700/83 |
| 6,243,095 B1 * | 6/2001 | Shile et al. | 345/854 |
| 2001/0035855 A1 * | 11/2001 | Komatsu et al. | 345/156 |
| 2002/0000998 A1 * | 1/2002 | Scott et al. | 345/667 |
| 2002/0075322 A1 * | 6/2002 | Rosenzweig et al. | 345/835 |
| 2002/0169766 A1 * | 11/2002 | Aoyama | 707/3 |

FOREIGN PATENT DOCUMENTS

EP    0 543 414 A    5/1993

OTHER PUBLICATIONS

XP 002301805, Aug. 6, 2001, Digital Domain Inc.
XP 002301804, Sep. 14, 2000, Feather River Canyon News.
XP 002302137, 1997, CTI Pet Systems, Inc.
XP 002301857, Jun. 11, 2000, Evertsz.

* cited by examiner

*Primary Examiner*—Wesner Sajous
(74) *Attorney, Agent, or Firm*—Martin Fleit; Paul D. Bianco; Fleit Kain Gibbons Gutman Bongini & Bianco P.L.

(57) ABSTRACT

A display system and method for the display of images wherein there is a selection of a partitioning of an image display area from a predefined set of partitionings and display of a representation of the partitioning of the image display area in an image selection area. Then, representations of images of a set of images are displayed in the image selection area. Next, an assignment is made of a selected representation of an image to be displayed to an area of the representation of the partitioning via a graphical user interface. Then, the image is displayed in a part of the image display area that corresponds to the area of the representation of the partitioning.

17 Claims, 5 Drawing Sheets

| | | | | |
|---|---|---|---|---|
| OVERVIEW DISPLAY | MLO R before | MLO L before | CC R before | CC L before |
| | MLO R current | MLO L current | CC R current | CC L current |
| | LEFT MONITOR | | RIGHT MONITOR | |
| CURRENT ANALYSIS | MLO R current | MLO L current | CC R current | CC L current |
| | LEFT MONITOR | | RIGHT MONITOR | |
| CC SINGLE DISPLAY | CC R current | | CC L current | |
| | LEFT MONITOR | | RIGHT MONITOR | |

FIG. 1

Erika Musterfrau, 2000-12-24

Patient Info

Last name: Musterfrau
First name: Erika
Birth name: Meier
Birthday: 2000-12-24
Address: Lindenstrasse 13, 28359 HB
Sex: F
ID: n/a

33

DISPLAY SYSTEM AND METHOD FOR THE DISPLAY OF IMAGES

BACKGROUND OF THE INVENTION

1. Field of the Invention

The invention relates to a method for displaying images and to a display system, in particular for medical images, for example, digital mammograms.

2. Prior Art

In the course of mammogram-screening for the purpose of preventing breast cancer, mammograms are taken in periodic intervals for all women of a specific target group and examined for suspicious circumstances. In each examination, an image of each breast is routinely taken from above (craniocaudal, CC) and from the side (mediolateral oblique, MLO). These four mammograms are usually compared with the four images of the preliminary examination, so that the radiologist, as a rule, must view eight mammograms for each case. Additionally, it can be desirable in displaying computer generated mammograms to, for instance, synthetically increase the contrast of some of the images in order to more clearly display suspicious structures.

The radiologist has only a short time for the examination of this multitude of images. A well trained radiologist is able to examine about 100 cases per hour. The reliable assessment of eight or more exposures in such a short time is then only possible if they are consistently presented to the radiologist in the same, familiar form and possibly existing additional views or images (also images of other modalities, for example, ultrasound images or MR-Mammograms) are quickly available.

The radiologist uses a special screening-analysis station for digital mammogram screening that generally consists of a high power computer with two high resolution monitors and special input apparatus for controlling the system. The monitors of such a system must be able to display at least 2000×2000 pixels with a grayscale depth of 8 or 10 bits/pixel. In spite of this high resolution, the digital mammograms, which consist of 4000×4000 pixels or more, must be scaled down for display or must be examined in parts.

In support of a fluid workflow, an analysis station offers several standardized arrangements of images on the monitors, whereby each monitor can be subdivided into two or four sub-windows. Typical examples of such arrangements are displayed in FIG. 1.

The possible arrangements, as well as the sequence in which the radiologist will view them, are for the most part configurable. Beyond these standard arrangements, the radiologist must have the capability to be able to display all available images in arbitrary arrangements. For example, a comparison can require the display of the current CC-image of a breast on the left and the corresponding image of the preliminary examination on the right, although this arrangement is not provided in the system configuration. Therefore, the manual arrangement of the individual images must be able to occur quickly and is allowed only a minimal interaction complexity in order to not hold up the work flow.

There already exist varied programs that have the ability to display several digital images in a freely selectable arrangement on a computer display screen. In most of these programs, the following interaction steps are required in order to carry out this task:

1. Adjust the desired partitioning of the display screen or display screens.
2. Select a sub-window, for example, via activation of the window with the mouse pointer.
3. Select the images to be displayed in this sub-window, for example, via a command to open the desired image.

Steps 2 and 3 must be repeated at this point for each image to be displayed. An alternative solution uses the well-known "Drag-and-Drop" technique to display the individual images in the respective windows. For this, an overview window is provided that contains a list of all available images. The individual images are represented in this list by their name or a symbolic representation. For each image to be displayed, the corresponding element of this list is clicked with a mouse, dragged to the desired window and "dropped" there.

Both of these solutions have the disadvantage that the mouse pointer must cover a long distance over the display screen or display screens, which can present significant interaction complexity with large monitors. Furthermore, the step of opening an image in the first solution is combined with further mouse clicks and interaction steps that additionally delay the user.

A further disadvantage is that it is not immediately obvious which image is to be displayed in which window. Furthermore, systems that are not tailored for radiological applications frequently do not have the ability to quickly partition the display screen into the routinely used one, two or four sub-windows. Instead, the respective partitioning must be manually performed by opening and arranging the individual windows.

A solution that is tailored to the requirements of digital mammogram screenings is described in U.S. Pat. No. 6,243,095 B1. Therein all available images (usually eight) are put out in a fixed arrangement in a navigation window that shows symbolic indicators of the individual images. The user moves a mouse pointer over the navigation window in order to select an image to be displayed. As soon as the pointer is located over a symbol that is associated with an image, the corresponding image is displayed in one of the monitors. Two mouse clicks can be additionally used to switch between different resolution modes so that the display of two or four images on one monitor is also possible.

With these displays, however, only images that are adjacent in a preconfigured arrangement in the navigation window can be simultaneously displayed on a monitor. In addition, it is assumed that the same images are available in all cases, which may not be true. Therefore, these solutions offer only very limited flexibility.

The known solutions all have one or more of the following disadvantages:

- The screening analysis usually use display screen partitioning into one or more sub-windows that is not fast and conveniently achieved.
- The selection of a sub-window in which to display an image requires moving the mouse to the respective sub-window, which entails a long mouse movement because of the size of the monitor.
- The selection of an image for display in a sub-window requires to much interaction complexity.
- The user has no quick overview of which image is open in a specific window, and also, in which window a particular image is open.
- The images can not be arbitrarily distributed in the display window, rather they are made available according to specified configurations.
- It is presupposed that for each case the same set of images remain available.

SUMMARY OF THE INVENTION

The invention has as an objective, to create an improved method for the display of images, an improved computer program product and an improved display system that overcomes one or more of the disadvantages of the state of the art.

The objectives of the invention are solved with the characteristics of the novel method for display of medical images comprising the steps of:

(a) selection of a partitioning of an image display area from a predefined set of partitionings and display of a representation of the partitioning of the image display area in an image selection area, (b) display of representations of images of a set of images in the image selection area, (c) assignment of a selected representation of an image to be displayed to an area of the representation of the partitioning via a graphical user interface, and (d) display of the image in a part of the image display area that corresponds to the area of the representation of the partitioning.

The method may comprise the further step of effecting the assignment of the selected representation by using drag-and-drop. The method may function whereby the predefined set of partitionings comprises the further step of effecting partitionings of the image display area for one, two or four images per display device. The method of the invention may comprise the further step of assigning the set of partitions a set of first buttons, so that the selection of a partitioning occurs by selection of a corresponding first button of the graphical user interface, and whereby the first button is preferably arranged in the image selection area.

The method according to the invention may comprise effecting the representation of the set of images by the display of a representative identifier for each image or by the display of a scaled down and/or symbolic display for each image. The method may comprise the further step of sorting the representation of the image by the creation date, and causing the representation of images with the same creation date to fade-in or fade out by the operation of a second button of the graphical user interface. The method can comprise the further steps of storing the assignment of one or more images to the representation of a first partition, selecting a second partition, reselecting the first partition, and retrieving the stored assignment of the one or more images to the representation of the first partitioning and corresponding display of the one or more images.

The method according to the invention may comprise the further step of changing an association of an image to an area of the representation of the partitioning by drag-and-drop of a selected representation of said image from the original area of the representation of the partitioning to the desired area of the representation of the partition. The method may comprise the further steps of marking a representation of an image in the representation of the partitioning for two or more images, selecting a partitioning for an image, and presenting a single image display of the image corresponding to the marked representation. The method as described above may comprise the further step of assigning in the image selection area each representation of an image a symbol that indicates if and in which position in a part of the image display area said image is to be displayed.

The invention further contemplates a computer program product for the generation of a graphical user interface for the execution of a method according to any of the above descriptions of the method.

The invention also includes a display system for the display of medical images comprising a means for the selection of a partitioning of an image display area from a predetermined set of partitionings, a display for the display of representations of images of a set of images in an image selection area, a graphical user interface for the assignment of a selected representation of an image to be displayed to an area of a representation of the partitioning, and a means for the display of images in a part of the image display area that correspond to the assignment.

The display system as described may comprise means for the display of a representation of the partitioning of an image display area in an image selection area whereby the graphical user interface comprise drag-and-drop means and may also be arranged whereby the means for the selection of a partitioning has a set of first buttons, whereby each first button is uniquely assigned to a partition, and whereby the first buttons are arranged in the image selection window. Also, the display system may be characterized wherein the means for display of the representations of images has a means for the display of a representative indication for each image and/or means for the display of a scaled down and/or symbolic display for each image.

The display system according to the invention may further comprise means for storage of the assignments of one or more images to the representations of a partitioning and with means for the retrieval of the stored assignment of the one or more images to the representation of the partitioning for the display of the one or more images after the partitioning is reselected. Still further, the invention may comprise means for the marking of a representation of an image in the representation of the partitioning for a plurality of images, so that the image corresponding to the marked representation is displayed in a single image display after the selection of a partitioning for one image.

Summarizing, the invention provides a display system and method for the display of images wherein there is a selection of a partitioning of an image display area from a predefined set of partitionings and display of a representation of the partitioning of the image display area in an image selection area. Then, representations of images of a set of images are displayed in the image selection area. Next, an assignment is made of a selected representation of an image to be displayed to an area of the representation of the partitioning via a graphical user interface. Then, the image is displayed in a part of the image display area that corresponds to the area of the representation of the partitioning.

The present invention enables a convenient selection of images, as well as, the selection of portions of an image display area, in which the relevant images should be displayed. This is advantageous for all applications wherein different images are offered for selection and different partitioning of an image display area can be simultaneously selected.

According to a preferred embodiment of the invention, the quick and flexible allocation of radiological images into display windows of a digital screenings-analysis station is enabled. Of particular advantage is that the standard partitioning of the examination monitor into one, two or four sub-windows, and also for each monitor when needed, can be quickly and efficiently selected.

According to a further preferred embodiment of the invention, the display system offers an overview of the available images and allows instantly recognizing which image is visible in which display window.

According to a further preferred embodiment of the invention, the display system features a graphical user interface that is tailored for use in the screenings-analysis and requires only minimal interaction and time. Particularly, the invention offers maximum flexibility in the display of the available images in all standard partitionings of the analysis monitors.

Particularly of further advantage, it is not presupposed that the same set of images are available for all cases. Views can also be displayed that only exist for a single case or rather whose display only seems to make sense for a single case.

BRIEF DESCRIPTION OF THE DRAWINGS

In the following, the preferred embodiments of the invention will be more clearly explained with reference to the figures. The figures show:

FIG. 1 shows a typical arrangement of images on the monitors of an analysis station, as is known in the prior art.

DETAILED DESCRIPTION OF PREFERRED EMBODIMENTS

Figure 2:
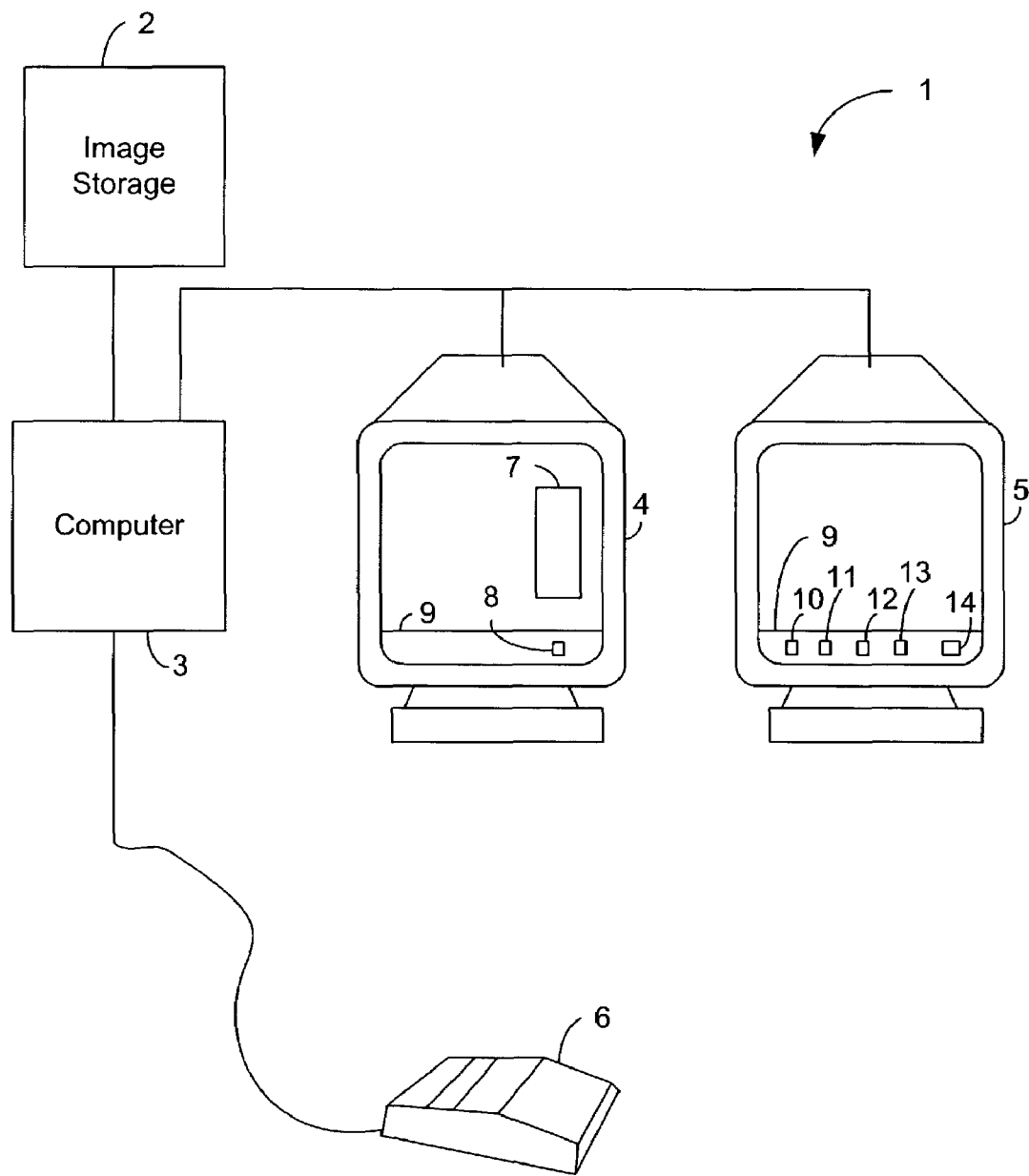
FIG. 2 is a schematic showing of an embodiment of a display system according to the invention.

FIG. 2 shows a display system 1, such as an analysis station for medical images, particularly digital mammograms. However, the display system 1 can also be used as a display system for other types of images, for example, for technical documents or analytical purposes.

In the following, but without assuming limitations on generality, the display system 1 is used for medical images and in particular for digital mammograms. The image storage 2 of the display system 1 contains many sets of images, wherein each set corresponds to a particular medical case, i.e., a particular patient. A radiologist examines these medical cases via the display system 1.

The image storage 2 is connected to a computer 3 that is, in turn, connected to the two monitors 4 and 5. More than two monitors or one monitor can be used in place of two monitors.

A computer mouse 6 is connected to the computer 3. The commands to the computer 3 for the selection and control of the display of images from the image storage 2 on the monitors 4 and 5 are provided by the radiologist via computer mouse 6 and possibly other input devices, such as a keyboard or a speech input device.

An image selection area 7 fades into its image display area on monitor 4. The fading out of the image selection area 7 can be ended and reactivated via selection of the button 8 of the graphical user interface, for example, by clicking on it with the computer mouse 6. Alternatively, this can also result from a control, such as with the right mouse button of the computer mouse 6 or via another associated input device, such as from a keyboard.

On monitor 4, a tool bar 9 is included within the image display area that contains additional buttons 10, 11, 12, 13 and 14. The tool bar 9 fades out, or reappears, as the case may be, through actuation of button 10. The buttons 11 through 14 perform the selection of one of the pre-configured, standard arrangement, such as, e.g., "overview display," "current examination" and "CC Single Display" (see FIG. 1) and/or other arrangements. Alternatively the tool bar 9 can fade out via a control, for example, with the right mouse button of the computer mouse 6 or via another associated input device, for example, from a keyboard.

The display element 14 serves to start a computer aided diagnosis (CAD) function. Further buttons can be arranged in the tool bar 9 for other functions.

Figure 3:
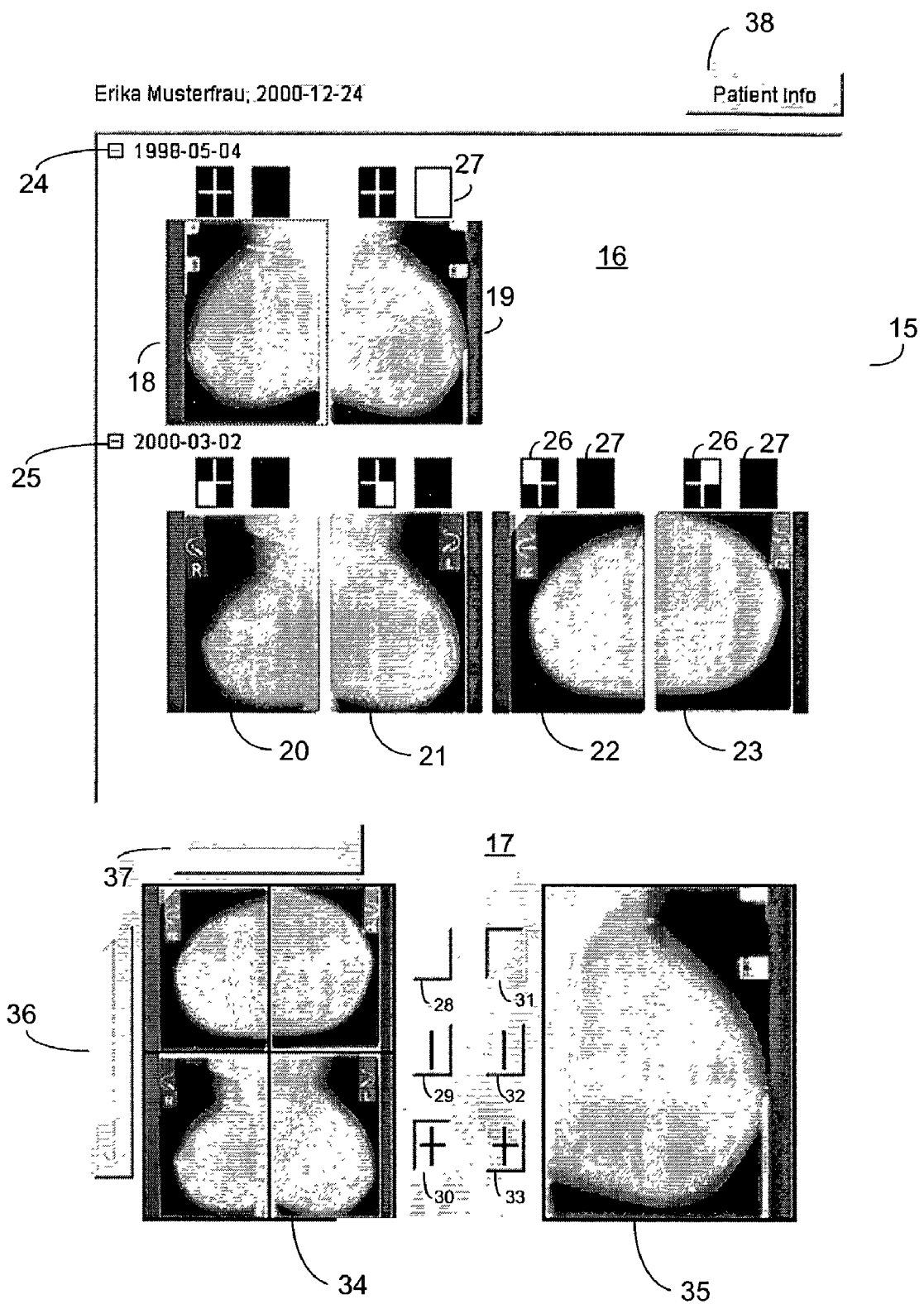
FIG. 3 shows a first display of an image selection area of the display system of FIG. 2.

FIG. 3 shows the window 15 of the image selection area 7 in FIG. 2. For each analysis, the four standard images MLO R/L and CC R/L are displayed as well as, if needed, additional presented images, such as, additionally processed (e.g., heightened contrast) versions of the existing image. Each image is represented therein by a symbol sized, shrunken view of itself (thumbnails).

Presented images can be examined by fading out via a click on the button 24 or 25 with the minus sign (−). A plus sign (+) is displayed in the button 24 instead of the minus sign (−) when the examinations fade out. The image of an examination is again expanded by a click on the plus sign.

In the example shown in FIG. 3, the images 18 and 19 belong to the examination of May 4, 1998 and the images 20 through 23 belong to the examination of Mar. 2, 2000. Actuation of the button 24 or 25 can also cause the respective examination dates belonging to images 18 and 19, as well as 20 through 23, to fade in and out.

The display in display area 16 displays scaled down representations of the images 18 through 23. Alternatively, the display can identify these representations by the display of a related descriptive symbol or by a representative identifier.

Above each image 18 through 23 in the area 17 is arranged a symbol 26 and a symbol 27. The symbol 26 is assigned to the left monitor and the symbol 27 is assigned to the right monitor (equivalent to monitor 4 and monitor 5 of FIG. 2). The symbol 26 and 27 always indicate if and in which portion of an image display area the image that is associated with the symbol is currently displayed. A black area in the symbol 26 or 27 indicates "no display" and a white area indicates "display."

In the area 17 of window 15 are located buttons 28, 29 and 30 for the left monitor and buttons 31, 32 and 33 for the right monitor. Button 28 serves for the selection of a partitioning of the image display area of the left monitor (which is monitor 4 in FIG. 2) for the display of individual images, button 29 for the selection of a partitioning for the display of two images and button 30 for the selection of a partitioning for the display of four images. Buttons 31, 32 and 33 correspondingly apply to the right monitor, which is monitor 5 of FIG. 2.

Figure 5:
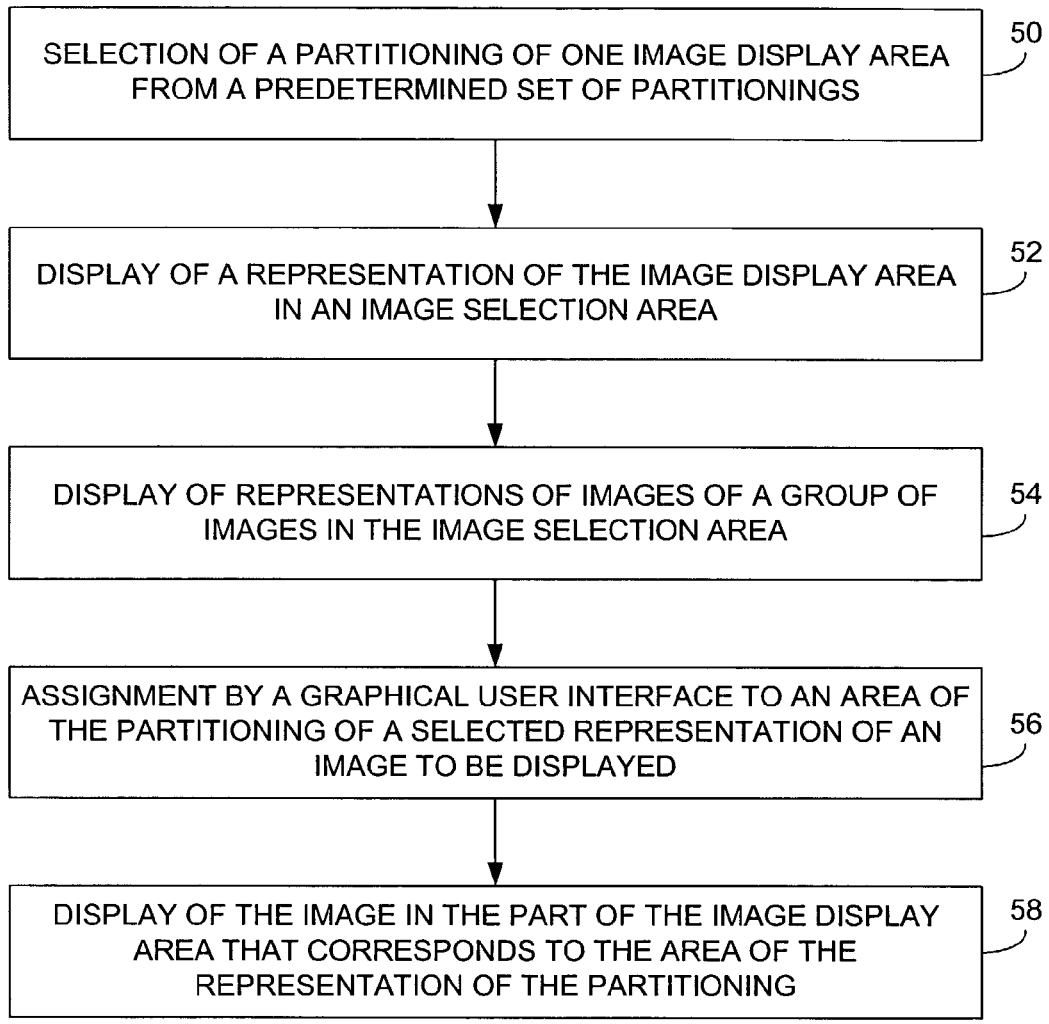
FIG. 5 is a processing flow diagram for the display of images according to the invention.

The image display areas of the left and right monitors are symbolized in the area 17 of the window 15 by the two rectangles 34 and 35, whereby the rectangle 34 is assigned to the left monitor (equivalent to monitor 4 of FIG. 2) and the rectangle 35 is assigned to the right monitor (equivalent to monitor 5 of FIG. 5).

The three possible partitionings of each monitor into one, two or four sub-windows can be activated independently from one another via the corresponding buttons (in between the rectangles 34 and 35) for the two monitors. Via the selection of a partitioning for a monitor, the symbolic monitor display is correspondingly divided or the division is canceled. Simultaneously, the division of the associated analysis monitors is correspondingly changed.

In order to display a particular image of a medical case under consideration on an image display area of one of the two monitors, the user first selects the desired monitor partitioning by "clicking" one of the buttons 28, 29 or 30 for the left monitor or one of the buttons 31, 32 or 33 for the right monitor. The user next clicks, with the computer mouse, on the representations of the desired image in the area 16 and "drags" the representation, while pressing the mouse button, onto the area of the rectangle 34 or 35 that corresponds to the desired partition of the image display area for the display of the image. The representations can also be so-called thumbnails.

A corresponding representation of the selected partition of the image display area in the rectangle 34 or 35 is preferably displayed after an operation of one of the buttons 28 through 33. If, for example, the button 28 or 31 were selected, rectangle 34 or the rectangle 35 appears without other partitioning. If, in contrast, the button 29 or 32 were selected, the rectangle 34 or the rectangle 35 will be divided in half by a vertical line running through the middle. Finally, if the button 30 or 33 were selected, the rectangle 34 or the rectangle 35 will be divided into four partitions, which correspond to the four partitions of the image display area, by a crossing horizontal and vertical line.

If the user, for example, has selected the button 30, a corresponding partition of the rectangle 34 will be displayed as representative of the corresponding partition of the image display area. This case is shown in the example of FIG. 3.

The user then selects one of the images 18 through 23 from the area 16, e.g., the image 22. The selection of the image 22 can occur, for example, by clicking with the computer mouse 6 (see FIG. 2). The user then "drags" the image 22 onto the left top quadrant in the rectangle 34, since the user would like to have the image 22 displayed in the left top quadrant of the left monitor.

As soon as the image 22 is located in the left top quadrant of the rectangle 34, the user releases the mouse button to cause the desired allocation of the image 22 to this part of the image display area. Immediately thereafter, the image 22 is displayed in the left top quadrant of the image display area of the monitor 4 (see FIG. 2).

Further, the left top quadrant of the symbol 26 will be marked white to symbolize the display of the image 22 in the left top quadrant of the left display screen.

Accordingly, one or more additional images from the area 16 can be assigned, by drag and drop to the rectangles 34 and 35, to the particular area of the rectangles 34 and 35. In the illustrated example, the user has assigned, using drag-and-drop, image 23 to the right top quadrant of rectangle 34, image 20 to the left bottom quadrant and image 21 to the right bottom quadrant of rectangle 34.

Further, the user has selected the single image display by selection of the button 31 for the right monitor. The user has then moved the image 19, via drag-and-drop, to rectangle 35. The corresponding allocation is shown in the symbol 27 of image 19 by the white area in the symbol 27.

The symbolic monitors in area 17, in the form of rectangle 34 and 35, therefore always reflect the partitioning and configuration of the analysis monitors. The symbols 26 and 27 also always provide a quick overview of which of the images in the area 16 are generally displayed in an image display area and, if an image is displayed, in which partitioning and in which area of the partitioning. The symbols 26 and 27 thereby always correspond to the partitioning selected by one of the buttons 28, 29 or 30, or 31, 32 or 33, respectively. When the selection of a partitioning is changed by clicking on a button, the corresponding symbol 26 or 27 also changes.

The allocation of images to their respective partitionings is maintained when changing back and forth between the individual partitioning of a monitor. The user can therefore, for example, select a single-view for a monitor, drag-and-drop an image into the view, subsequently change into the quad-view and select four additional images for viewing in this partitioning, and now choose to arbitrarily change back and forth between the single and quad-view. The computer stores the allocation of images selected for a partitioning until the assignment is changed by the user.

When a monitor is set to a partitioning with two or four sub-windows, a button 36 or 37 with a two sided vertical or horizontal arrow appears in the area 17 over or next to the monitor-rectangle 34 or 35. The images on the left and right are exchanged by a click on the button 37 and the images on the top and bottom are exchanged by a click on the button 36 (only when using four sub-windows).

When the user of the computer mouse 6 (see FIG. 2) clicks on the button 37, the example of FIG. 3 results in the exchanging of the left and the right images, i.e., image 22 and 23 as well as the image 20 and 21, with each other, i.e., image 22 will then be displayed in the right top quadrant and image 20 in the right bottom quadrant of the rectangle 34. Correspondingly, image 23 will be displayed in the left top quadrant and image 21 in the left bottom quadrant of the rectangle 34.

The top images 22 and 23 are exchanged with the bottom images 20 and 21 in a corresponding manner by clicking on the button 36.

An image can be shifted from one sub-window in another by the user's pulling the "thumbnail" in the area 17 via drag-and-drop from one sub-window to another. By double-clicking on a thumbnail in area 17, the associated image disappears from the sub-window, and also from the image selection area of the monitor, and the sub-window is subsequently empty.

An image that is in a sub-window of a dual- or quad-partition can be expanded to onto a single image display on the entire display screen. For this the user marks the relevant thumbnail in one of the rectangles 34 or 35—for example, by clicking with the mouse—whereby the thumbnail is highlighted by a framing. Subsequently the user clicks on the button 28 or 31 for the single partitioning of the corresponding monitor. The previous partitioning of the monitor is then canceled and the marked image is displayed in the full size of the monitor. The shrunken image display in the rectangle 34 and 35 thereby always corresponds to the display shown on the monitors The user also has the option, for example, to use drag-and-drop to move the thumbnail of the left top quadrant of rectangle 34, which displays image 22, onto another quadrant in rectangle 34 or also onto rectangle 35 and to then "drop" it by releasing the mouse button. For example, the user thus moves the thumbnail of the top left quadrant of rectangle 34, which corresponds to image 22, onto rectangle 35, such that image 22 will be displayed in single image view on the right monitor. The left top quadrant of rectangle 34 is then empty.

Accordingly, the symbols 26 and 27 of image 22 will also be changed: all quadrants of symbol 26 will be displayed in black, because image 22 is not displayed in any of the quadrants of the left monitor. In contrast, the fill color of the symbol 27 changes from black to white, to indicate that image 22 is displayed on the right monitor as a single image.

The user also has the option of hiding one of the thumbnails in rectangle 34 and 35 via a double-click of the computer mouse. For example, the user goes with the computer mouse onto the thumbnail of rectangle 35, which represents image 19, and then does a double-click so that the display of the thumbnail disappears from rectangle 35 and rectangle 35 is empty. Correspondingly, the fill color of the symbol 27 of image 19 changes from white to black and the image also disappears from the right monitor.

The user further has the option of selecting an image, which is currently displayed in a multiple-image display on one of the monitors, for the single image display. If the user, for example, desires to have image 21 in a single image display on one of the monitors, he proceeds as follows:

Initially, the thumbnail that corresponds to image 21, and that is in the right bottom quadrant of rectangle 34, is selected with a mouse click. This selection of the thumbnail in the right bottom quadrant of rectangle 34 is indicated by a special framing of this thumbnail.

The user then clicks on the button 28 in order to select the single image display for the left monitor. The previously marked image 21 is then displayed as a single image in full size on the left monitor. The previous assignment of thumbnails to the quadrants of rectangle 34 in the quad-view then remains stored.

When the user desires to return to the quad-view from the single-view, he can achieve this by simply pressing button 30. The original assignment of thumbnails to the quadrants of rectangle 34 are again retrieved and displayed in rectangle 34 as well as on the left monitor. From then on the user can also again return to the single image display by repressing button 28.

The window 15 has a button 38 in an upper area that allows information about the patient of the medial case under consideration to be retrieved.

Figure 4:
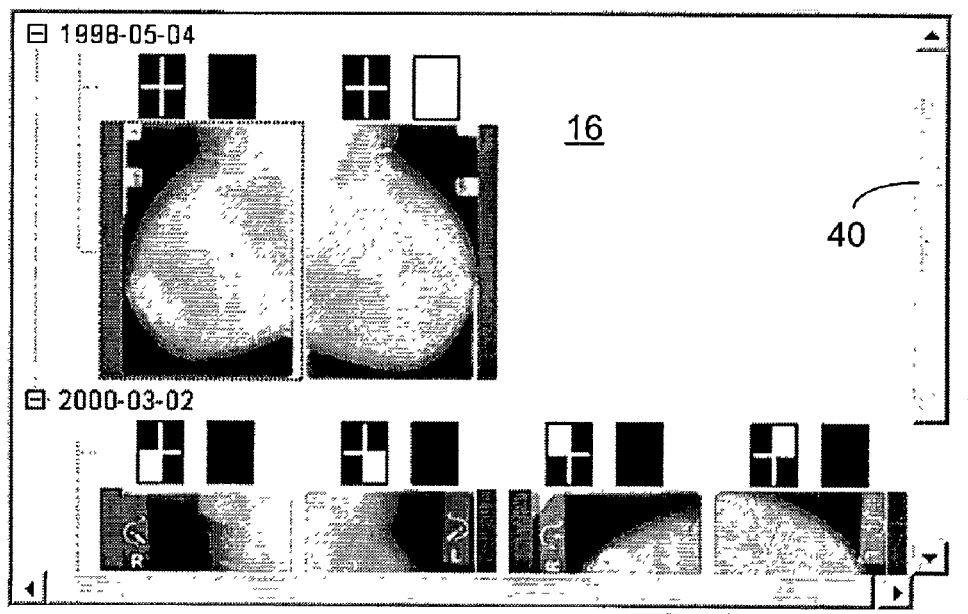
FIG. 4 shows a second display of the image selection area.
Figure 4:
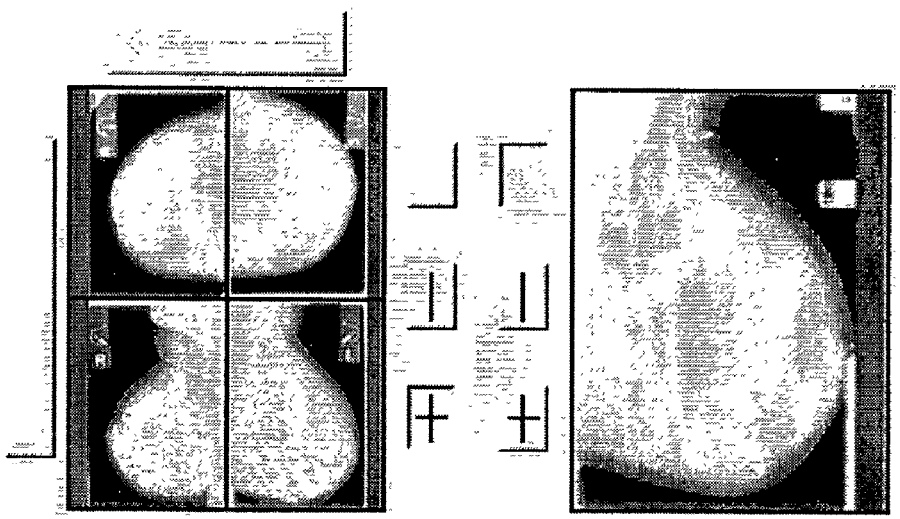

FIG. 4 shows the window 15, after the user has operated button 38. Area 39 of window 15 then displays patient information, such as last name, first name, name at birth, date of birth, address, sex, as well as an identification number. Simultaneously, area 16 of window 15 shrinks and a strip 40 appears, to still allow viewing and selection of all images 18 though 23 of the area 16.

FIG. 5 shows a flow diagram of a preferred embodiment of the method of the invention. In step 50, the partitioning of the image display area on a monitor is selected from a predetermined set of partitions. If more than one image display area exists on the same monitor or on one or more other monitors, then a partitioning for each of the image display areas is selected.

In the example design of FIG. 3, this occurs for the rectangles 34 and 35 that represent the image display areas of monitors 4 and 5 (see FIG. 2), by operation of one of the buttons 28, 29 or 30; or 31, 32 or 33, respectively.

In step 52, a representation of the selected partitioning of the image display area is shown in an image selection area. With multiple selected partitionings of different image display areas, other corresponding representations of those partitionings will likewise be shown in the image selection area.

This is performed in the embodiment of FIG. 3, for the quad-view, i.e. after the operation of the button 30 for the rectangle 34, by two crossing horizontal and vertical lines in the rectangle 34 that symbolize the partitioning of the related image display area of the left monitor. With the operation of the button 29 for the dual-view, simply a vertical line will appear in the rectangle 34, to correspondingly equally bisect the dual-view. With the operation of button 28, however, no other lines will be shown in the rectangle 34, as corresponds to a representation of the partitioning for a single image. The buttons 31 through 33 correspondingly apply to rectangle 35. Alternatively or additionally the representation of the partitioning is indicated by a graphical accentuation of the button or buttons that have been activated for the selection of the partitioning. In the example design of FIG. 3 this occurs via a display of the buttons 30 and 31 that have the spatial effect of a depressed button.

In step 54, representations of images of a set of images are displayed in the image selection area. The set of images are defined, for example, by the image that belong to a certain medical case. These images are displayed by their representation in the image selection area. The representations can, for example, be scaled down images, so-called thumbnails, or another symbolic display or a representative identifier. The embodiment of FIG. 3 displays the images 18 through 23 as the representations of the medical images of the case under consideration. The display of these images fades in and out by operation of the buttons 24 or 25.

In step 56, the representation of an image is selected and is assigned, for example via Drag-and-Drop, to an area in the representation of one of the partitions. This occurs in the example design of FIG. 3, for example, by selection of, via clicking on with the mouse, one of the images 18 through 23 and then moving it with the mouse onto an area of rectangle 34 or 35. As soon as the selected representation of the image to be displayed is located above the desired sub-window area in the rectangle 34 or 35, the user of the computer mouse lets go in order to "drop" the representation there and therefore create an assignment.

In the example design of FIG. 3, it can also occur that the user clicks on a representation of an image to be selected, image 22 for example, and then drags it with the mouse onto the left top quadrant of the representation of the partitioning of a quad-view of rectangle 34 and drop it there. Thereby the allocation of the selected representation, i.e., image 22, is made to the left top quadrant of the quad-view on the left monitor.

In step 58, the display of the respective images is performed, i.e., the display of image 22 in the left top quadrant of the left monitor in this example. Subsequently, one or more other representations of images can be assigned, via drag-and-drop, to different areas of the partitioning of the left and the right monitors, in order to result in the assignments of the example design of FIG. 3, for example.

There follows a reference indicator list for the elements shown in the drawings and discussed in the foregoing description.

REF# ITEM

1 Display System
2 Image Storage
3 Computer
4 Monitor
5 Monitor
6 Computer Mouse
7 Image Selection Area
8 Button
9 Tool Bar
10 Button
11 Button
12 Button
13 Button
14 Button
15 Window
16 Area
17 Area
18 Image
19 Image
20 Image
21 Image
22 Image
23 Image
24 Button
25 Button
26 Symbol 27 Symbol
28 Symbol
29 Button
30 Button
31 Button
32 Button
33 Button
34 Rectangle
35 Rectangle
36 Button
37 Button
38 Button
39 Area
40 Strip

The invention claimed is:

1. Method for display of medical images comprising the following steps:
   (a) selecting a partitioning of an image display area from a predefined set of partitionings and displaying a representation of the partitioning of the image display area in an image selection area,
   (b) displaying representations of images of a set of images in the image selection area,
   (c) assigning a selected representation of an image to be displayed to an area of the representation of the partitioning via a graphical user interface,
   (d) displaying the image in a part of the image display area that corresponds to the area of the representation of the partitioning, and
   (e) sorting the representations of the images by creation dates, and causing the representations of images with the same creation date to fade-in or fade out by the operation of a first button, associated with the representation of images with the same creation date, of the graphical user interface, wherein where the image representations for a creation date are viewable, the button is represented as a minus sign (−), operation of which causes the representations to fade-out, and where the button is represented as a plus sign (+), operation of which caused the image representation for a creation date to fade-in.

2. The method according to claim 1, comprising the further step of effecting the assignment of the selected representation by using drag-and-drop.

3. The method according to claim 1, whereby the predefined set of partitionings comprises the further step of effecting partitionings of the image display area for one, two or four images per display device.

4. The method of claim 1, comprising the further step of assigning the set of partitions a set of seconds buttons, so that the selection of a partitioning occurs by selection of a corresponding second button of the graphical user interface, and whereby the second button is preferably arranged in the image selection area.

5. The method according to claim 1, comprising effecting the representation of the set of images by the display of a representative identifier for each image or by the display of a scaled down and/or symbolic display for each image.

6. The method according to claim 1, comprising the further steps of (f) selecting a second partitioning.

7. The method according to claim 1, comprising the further step of changing an association of an image to an area of the representation of the partitioning by drag-and-drop of a selected representation of said image from the original area of the representation of the partitioning to the desired area of the representation of the partition.

8. The method according to claim 1 comprising the further steps of:
   (f) marking a representation of two or more images, and
   (g) presenting a single image display of the marked representation.

9. A computer program product for the generation of a graphical user interface for the execution of a method according to claim 1.

10. Method for display of medical images comprising the following steps:
    (a) selecting a partitioning of an image display area from a predefined set of partitionings and displaying a representation of the partitioning of the image display area in an image selection area,
    (b) displaying representations of images of a set of images in the image selection area,
    (c) assigning a selected representation of an image to be displayed to an area of the representation of the partitioning via a graphical user interface,
    (d) displaying the image in a part of the image display area that corresponds to the area of the representation of the partitioning,
    (e) sorting the representations of the images by the creation date, and causing the representations of images with the same creation date to fade-in or fade out by the operation of a first button of the graphical user interface, and
    (f) assigning a symbol, in the image selection area to each representation of an image, that indicates if and in which position in a part of the image display area said image is to be displayed.

11. Display system for the display of medical images comprising means for the selection of a partitioning of an image display area from a predetermined set of partitionings, a display for the display of representations of images of a set of images in an image selection area, a graphical user interface for the assignment of a selected representation of an image to be displayed to an area of a representation of the partitioning, means for the display of images in a part of the image display area that correspond to the assignment and means for sorting the representation of the image by creation dates, and causing the representation of images with the same creation date to fade-in or fade out by the operation of a first buttons associated with the representation of images with the same creation date, of the graphical user interface, wherein where the image representations for a creation date are viewable, the button is represented as a minus sign (−), operation of which causes the representations to fade-out, and where the button is represented as a plus sign (+), operation of which caused the image representation for a creation date to fade-in.

12. The display system according to claim 11 comprising means for the display of a representation of the partitioning of an image display area in an image selection area whereby the graphical user interface comprise drag-and-drop means.

13. The display system according to claim 11, whereby the means for the selection of a partitioning has a set of second buttons, whereby each second button is uniquely assigned to a partition, and whereby the second buttons are arranged in the image selection window.

14. The display system according to claim 11, wherein the means for display of the representations of images has one of means for the display of a representative indication for each image and means for the display of one of a scaled down and symbolic display for each image.

15. The display system according to claim 11 further comprising means for storage of the assignments of one or more images to the representations of a partitioning and with means for the retrieval of the stored assignment of the one or more images to the representation of the partitioning for the display of the one or more images after the partitioning is reselected.

16. The display system according to claim 11, further comprising means for the marking of a representation of an image in the representation of the partitioning for a plurality of images, so that the image corresponding to the marked representation is displayed in a single image display after the selection of a partitioning for one image.

17. Method for display of medical images comprising the following steps:
   (a) selecting a partitioning of an image display area from a predefined set of partitionings and displaying a representation of the partitioning of the image display area in an image selection area,
   (b) displaying representations of images of a set of images in the image selection area,
   (c) assigning a selected representation of an image to be displayed to an area of the representation of the partitioning via a graphical user interface,
   (d) displaying the image in a part of the image display area that corresponds to the area of the representation of the partitioning, and
   (e) assigning a symbol, in the image selection area to each representation of an image, that indicates if and in which position in a part of the image display area said image is to be displayed.

* * * * *